Nov. 20, 1934.  J. W. HOGUE  1,981,509

CLOTH MEASURING DRUM

Filed Feb. 7, 1930

Inventor
John W. Hogue
by Geo. N. Goddard
Attorney

Patented Nov. 20, 1934

1,981,509

UNITED STATES PATENT OFFICE 1,981,509

CLOTH MEASURING DRUM

John W. Hogue, Springfield, Vt., assignor to Parks & Woolson Machine Company, Springfield, Vt., a corporation of Vermont Application February 7, 1930, Serial No. 426,575

7 Claims. (Cl. 33—129)

This invention relates to measuring drums and particularly that type of measuring drum that is used in machines that measure cloth by passing the cloth over a revolving drum of unit circumference, such as a yard, or a fraction thereof, or a multiple thereof, in order to indicate the measurement of the cloth passed over it.

Different widths and different weaves of cloth will be stretched in varying degrees as they pass over the rotating measuring drum and, for this reason it is important to provide a reliable adjustment by which the circumferential measurement of the drum may be somewhat increased or decreased to suit the requirements occasioned by varying characteristics of the fabric to be measured, including varying degrees of distensibility, thickness, etc.

Heretofore, expansible and contractible drums with a rough coated surface have been used for this purpose, but such drums were made with a substantial gap extending along one side of the peripheral shell, which gap was increased or diminished in width in making the adjustment but was always present as an objectionable factor in the measurement of the cloth.

It is the object of the present invention to produce an expansible and contractible drum construction which will form a continuous cloth-engaging, rough-surfaced periphery, while at the same time being expansible and contractible for the purposes of adjustment to suit the requirements of different kinds of fabrics to be measured.

The present invention is characterized by a continuous surface cylindrical drum provided with internal supporting means associated with adjusting means for expanding and contracting the drum, while still preserving a continuous cloth-engaging cylindrical surface. Special features forming part of this invention are found in the construction of the contractible and expansible, continuous surface drum, as well as in the means by which the adjustment of the circumferential dimensions or measurement of such drum is effected.

These and other features of the invention will be particularly described in the following specification and will be defined in the claims hereto annexed.

In the accompanying drawing I have illustrated a simple and convenient construction and arrangement embodying the principles of this invention, in which Fig. 1 is a longitudinal central section through the drum and its supporting means, on section plane 1—1 of Fig. 2, one interior spider being shown in elevation.

Figure 1:
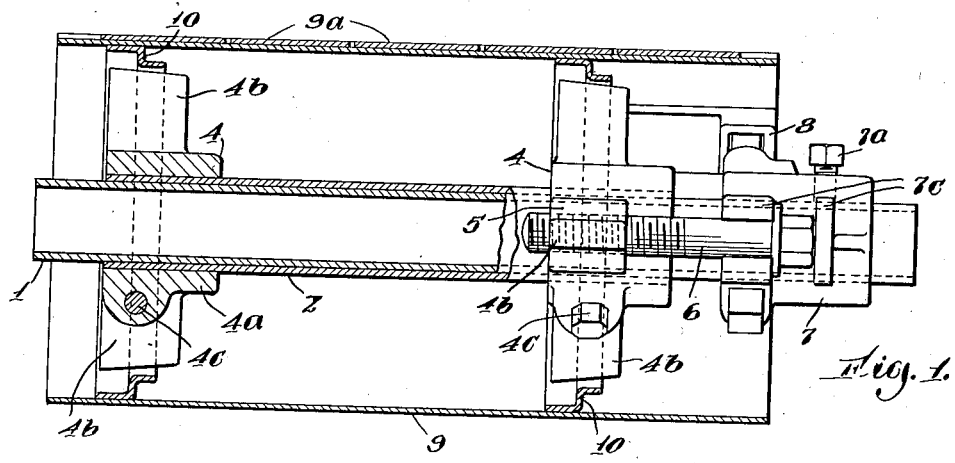

In the practice of this invention according to the form illustrated in the drawing, I provide a longitudinal rotary bearing shaft 1, which is preferably made hollow to lighten the weight of the structure and which has projecting ends adapted to form bearing journals for supporting the drum rotatably.

Surrounding the shaft 1 is a longitudinally adjustable sleeve 2, around which are firmly clamped by contracting screws $4^c$ any desired number of supporting spiders 4 according to the axial length of the drum being constructed.

These spiders 4 are provided with split clamping hubs $4^a$ carrying radial arms, or lugs, $4^b$, one of which is split and carries the clamping screws $4^c$ and whose outer end faces are bevelled in frusto-conical form, taken collectively to engage interior supporting and stiffening rings 10 which are brazed or otherwise fastened to the peripheral shell 9 at points distant from the gap $10^a$.

These interior rings 10 are made with flanges projecting from opposite sides to afford proper width of drum-engaging and spider-engaging annular surfaces without being unduly heavy.

The peripheral shell 9 of the drum is usually formed of a strip of sheet metal of suitable width and of sufficient length so that, when the shell is bent into cylindrical form, it will have the required standard unit of measurement, one yard or half yard or the like, when its edges are overlapped in the manner hereinafter to be described.

One of the end edges of the strip forming the shell is provided with a series of slits, extending some distance inwardly from the edge in the circumferential direction of the drum, to form a series of adjacent tongues extending across the width of the sheet. The adjacent overlapping opposite end portion of the sheet is formed with a transverse series of slots $9^b$, each of which subtends one of the tongues of the other edge and are dimensioned to permit the insertion or threading of the tongues through the slots so as to form a continuous surface.

It is customary to coat the peripheral shells of cloth measuring drums with sand or ground cork to afford a good frictional contact between the cloth and the surface of the drum. The rough material is applied to the shell after the latter has been coated with varnish, shellac, or other suitable adhesive. Such adhesives, however, as are commonly employed become very hard. Moreover, their adhesive properties are so great when dried that, if applied in a fluid condition, as they necessarily would be, they would fill the interstices between the tongues and the overlapping ends of the shell and this would interfere with effecting the desired expansion or contraction of the shell.

To obviate this difficulty it is my practice, before coating the shell with adhesive, to fill the slots and interstices of the joints with putty so as to exclude the flowing of the adhesive coating into these joints and preventing the trouble that would result therefrom.

I have attempted to represent this construction in the drawing by showing at 12 the packing or sheet of putty, or similar plastic material, applied to exclude from the cracks of the joints the inflow of the liquid adhesive, while the adhesive carrying the sand, cork, or other roughening material is shown as a distinct layer at 13 overlying the putty-filled joints. I use putty for a filler because, not only will it exclude the adhesive coating, but is itself, when dry, sufficiently friable to permit the limited adjustment necessary to compensate for the action of different kinds of fabric being measured.

Figure 2:
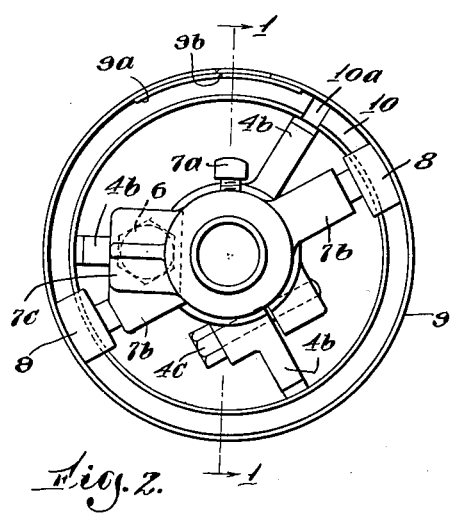
Fig. 2 is an end elevation.
Figure 4:
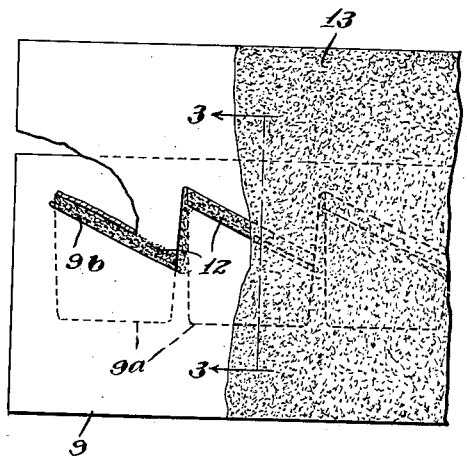
Fig. 4 is a plan view of a portion of the drum showing the construction and arrangement characterizing the expansible joint between the overlapped edge portions of the sheet forming the shell.
Figure 3:
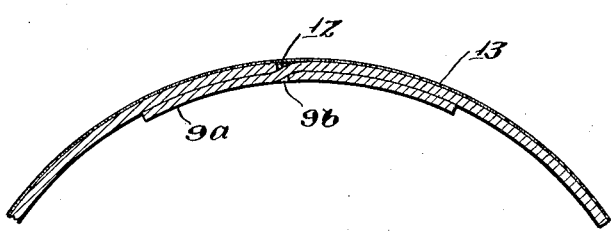
Fig. 3 is a cross section of the jointed overlapping ends of the peripheral shell of the drum.

The means for effecting adjustment of the circumferential measurement of the peripheral shell is shown in Fig. 1 and Fig. 2. It comprises a spider hub 7 provided with a set screw 7ᵃ for securing the hub firmly to the shaft and has oppositely projecting arms 7ᵇ, whose outer ends are reduced by machining or otherwise to fit into slotted shoes or lugs 8 secured to the inside of the drum. This spider, in conjunction with the slotted shoes or socket members 8, forms an anchoring means for preventing longitudinal movement of the drum with relation to its supporting shaft, which forms the backbone of the structure. The spider 7 is also provided with a transversely slotted ear, or lug 7ᶜ, which receives the end head of an adjusting screw 6 which is tapped into a projecting lug 5 formed on the adjacent expanding spider 4. The adjusting screw or bolt 6 can be rotated to draw the adjacent spider 4 toward it, or push it away from it, according as it is desired to expand or to contract the peripheral shell. These interior supporting rings 10, as shown at 10ᵃ, are split to leave an adequate gap for effecting the desired expansion and contraction. The rings themselves, as well as the surrounding shell, are made with normal circumference somewhat smaller than would be used in actual service. Both are capable of expansion under the outward thrust of the axially movable expansion heads, or spiders, 4ᵇ, which they tend to contract against when the expanding spiders are moved to permit the shell and the rings to contract upon the smaller portion of the bevelled arms 4ᵇ. The inherent spring of the metal is sufficient to produce such contraction.

It should be noted that the individual slots 9ᵇ, forming the transverse series from side to side of the shell, are formed on lines oblique to the longitudinal axis of the shell, thus giving the series of slots a zigzag or saw-tooth arrangement. This diagonal arrangement of the slots is advantageous because it leaves sufficient unsevered material between adjacent ends of adjacent slots to afford a sufficiently strong construction to meet service requirements, whereas if the slots were extended in straight alignment, end to end, very little of the sheet would be left between unless the tongues were cut to quite narrow dimensions. The caulking of the joints between the overlapped end portions of the shell by a friable material, such as putty, prevents the joint members from being so powerfully stuck together and embedded in a hard unyielding matrix which would interfere with the proper adjustment of the drum.

Since both the expanding spiders are firmly secured to the longitudinally slidable sleeve 2, the movement of the spider adjacent to the anchored adjusting screw is transmitted to the other spider or spiders so that all parts of the drum are simultaneously expanded or contracted in unison.

It will be seen therefore that not only is the continuity of the cylindrical surface obtained by the above described construction, but as the thin shell is supported on light pressed metal rings resting upon the expanding spiders, which also can be made of very light construction, the greatly desired lightness of the measuring drum is achieved, while at the same time the drum always presents a true cylindrical periphery. All these advantages are secured with a construction that is relatively inexpensive and easy to make.

What I claim is:

1. In a cloth measuring drum, the combination of a cylindrical shell of variable circumference comprising a sheet metal strip bent into cylindrical form with its opposite end edges brought into overlapping relationship, one of said end edges being provided with slits extending inwardly in a circumferential direction to form separate tongues, the other edge being provided with a transverse series of slots arranged at a distance from the end edge and dimensioned to allow the insertion of said tongues to form an expansible joint, while preserving the continuity of the shell, and interiorly disposed means for rotatably supporting and for expanding said shell to vary its circumferential measurement.

2. An expansible shell for a cloth measuring drum, embracing a strip of sheet material bent into cylindrical form with its adjacent ends overlapping each other, one of said ends being provided at a distance from its end edge with a transverse series of separate diagonal slots, the other edge of said sheet being provided with tongue-forming slits extending from the edge inwardly in a circumferential direction to permit the insertion of the individual tongues into their corresponding slots to form an expansible joint between the overlapped ends of the shell, while preserving the continuity of the shell surface.

3. An expansible shell for a cloth measuring drum, embracing a strip of sheet material bent into cylindrical form with its adjacent ends overlapping each other, one of said ends being provided at a distance from its end edge with a transverse series of separate diagonal slots, the other end edge of said sheet being provided with tongue-forming slits extending from the edge inwardly in a circumferential direction to permit the insertion of the individual tongues into their corresponding slots to form an expansible joint between the overlapped ends of the shell, while preserving the continuity of the shell surface, and a layer of friable material filling the interstices of said joints, and an outside coating of adhesive material forming an adhesive matrix for a layer of cloth-engaging comminuted material affording a frictional cloth-engaging surface.

4. A cloth measuring drum embracing in its construction a central shaft, a peripheral shell provided with inwardly projecting reenforcing and contracting split rings normally exerting contractile tension on said shell, interior supporting spiders mounted on said shaft and having ring-engaging peripheral surfaces concentric with the axis of the shaft whereby the shell is supported in cylindrical form concentric with the shaft axis, the opposite end edge portions of the sheet forming the shell being provided, respectively, with circumferential slits forming tongues and a transverse series of obliquely disposed slots dimensioned to permit the insertion of the tongues from the outside through said slots to the interior of the drum.

5. A measuring drum embracing in its construction a central supporting shaft, and a plurality of axially adjustable spiders having peripheral faces which are concentric with the shaft axis, a circumferential shell comprising a metallic sheet bent into cylindrical form and having its adjacent end edge portions provided respectively with tongue forming slits and tongue receiving slots permitting the respective end portions to lap by each other and lie inside of subtending cylindrical portions of the shell, the shell being normally contracted around said spiders and being expansible by the adjustment of said spiders.

6. A cloth measuring drum embracing in combination a central shaft, plural spiders axially adjustable along said shaft having frusto-conical peripheral faces concentric with said shaft, a peripheral expansible and contractible shell comprising a sheet of metal bent into cylindrical form and anchored against movement axially of said shaft, reenforcing split rings attached to the inside surface of said shell and forming an intermediate support between said spiders and said shell whereby the axial adjustment of the spiders acts to expand or to contract the shell while preserving the cylindrical contour thereof.

7. A peripheral contractible and expansible shell for a cloth measuring machine embracing a metallic sheet bent into cylindrical form and having its opposite end portions provided, respectively, with longitudinal slits forming circumferentially extending tongues and with transverse tongue-receiving slots to permit said ends being lapped by each other to lie inside the respective subtending portions of the cylindrical shell, thereby avoiding any external ridge or projection on the outside of said shell beyond the outer cylindrical surface of the shell.

JOHN W. HOGUE.